Figure 1:
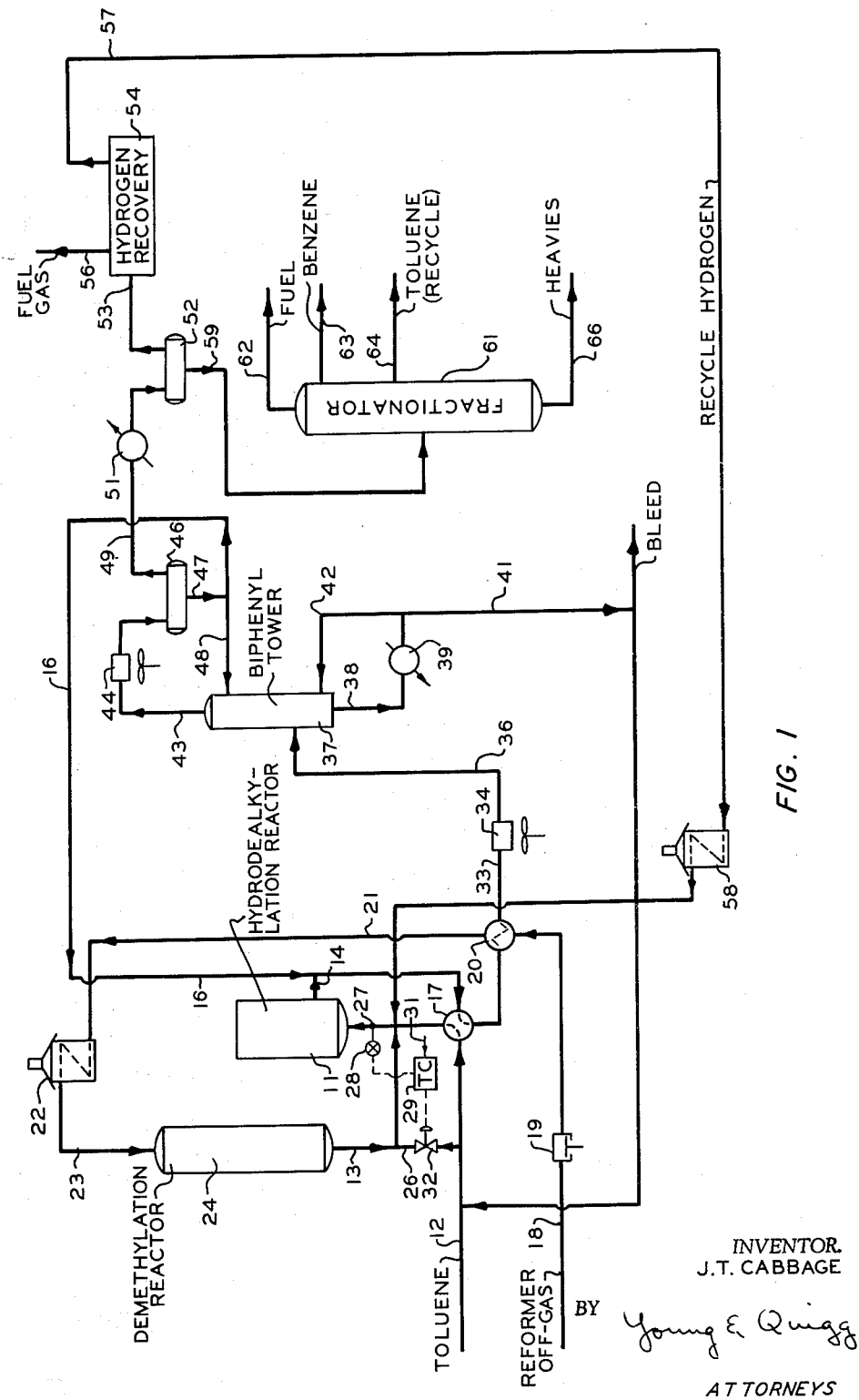

INVENTOR.
J.T. CABBAGE
BY Young E. Quigg
ATTORNEYS

INVENTOR.
J.T. CABBAGE
BY Young & Quigg
ATTORNEYS

INVENTOR.
J.T. CABBAGE
BY Young & Quigg
ATTORNEYS

3,213,150
HYDROGENATION WITH DEMETHYLATED REFORMER OFFGAS

John T. Cabbage, Bartlesville, Okla., assignor to Phillips Petroleum Company, a corporation of Delaware
Filed Jan. 2, 1962, Ser. No. 163,645
5 Claims. (Cl. 260—667)

This invention relates to the hydrogenation of hydrocarbon materials. More particularly, it relates to a method and apparatus for demethylating a hydrogen stream containing light demethylizable hydrocarbons, such as a reformer offgas stream. In another aspect, it relates to a method and apparatus wherein such a demethylized hydrogen-containing stream is used in exothermic hydrogenation reactions, such as the hydrodealkylation of toluene to benzene and the hydrogenation of benzene to cyclohexane.

In many hydrogenation processes it is a common practice to use impure hydrogen streams, such as reformer offgas, as a source of hydrogen. Such impure hydrogen streams contain one or more light hydrocarbons, such as ethane, propane and butane. The hydrogenation reactions are exothermic and are carried out at certain elevated temperatures. In the use of the impure hydrogen stream in certain of these exothermic processes, such as in the hydrodealkylation of toluene to benzene, the light hydrocarbon components of the impure hydrogen stream are subjected to an exothermic demethylation reaction, and the resulting heat of demethylization is added to that resulting from the hydrogenation conversion of the hydrocarbon feed. Thus, the use of impure hydrogen streams in these latter exothermic hydrogenation reactions tends to increase the hydrogenation reactor temperature above that desired, necessitating the provision of large cooling capacity and/or reactors made of expensive alloy steels which can withstand the higher temperatures. In certain other of these exothermic reactions, such as the hydrogenation of benzene to cyclohexane, the light hydrocarbons present in the impure hydrogen stream are not demethylated in the hydrogenation reactor but are present in the hydrogenation effluent and as such cause separation difficulties in that more elaborate and expensive equipment to recover a hydrogenated product of high impurity is required.

Figure 2:
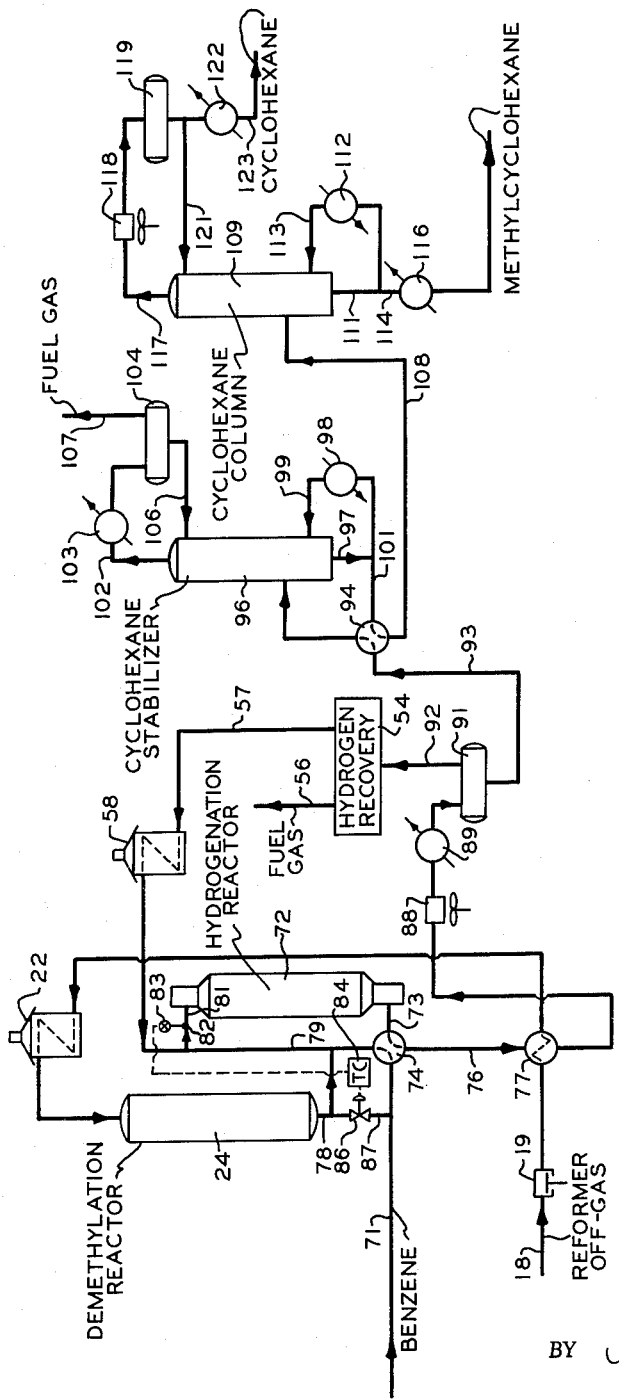
Figure 3:
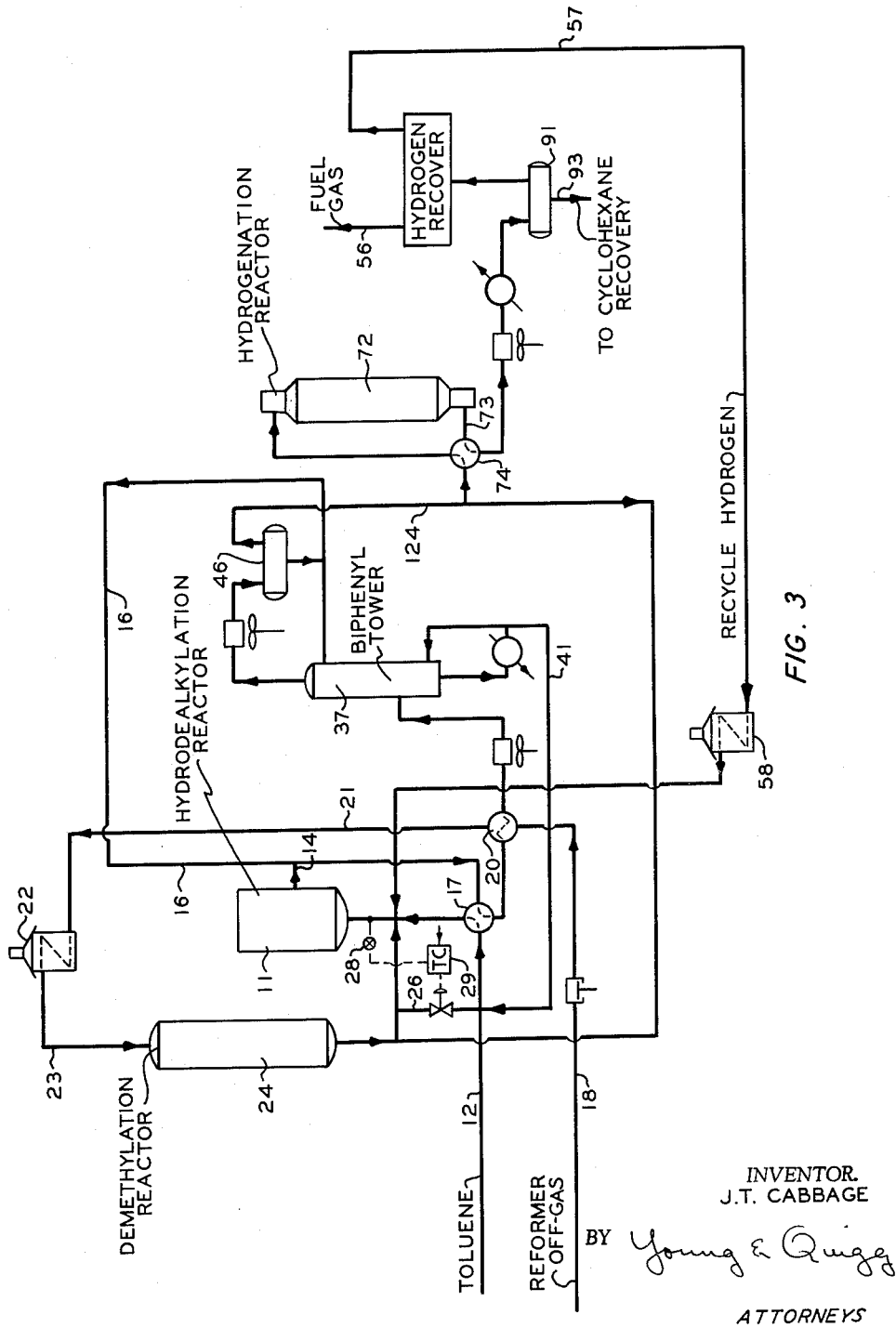

Accordingly, an object of this invention is to improve the operation of hydrogenation processes using an impure hydrogen stream, such as reformer offgas. Another object is to provide a method and apparatus for demethylating a hydrogen stream containing light demethylizable hydrocarbons, such as ethane, propane and butane. Another object is to provide a method and apparatus wherein such demethylized hydrogen streams are used in an exothermic hydrogenation reaction, such as the hydrodealkylation of toluene to benzene and the hydrogenation of benzene to cyclohexane. Further objects and advantages of this invention will become apparent to those skilled in the art from the following discussion, appended claims and accompanying drawing wherein:

FIGURE 1 is a schematic flow diagram of a process for hydrodealkylating toluene to benzene with the novel features of this invention illustratively associated therewith;

FIGURE 2 is a schematic flow diagram of a process for the hydrogenation of benzene to cyclohexane with the novel features of this invention associated therewith; and FIGURE 3 is a schematic flow diagram of an integrated process for the hydrodealkylation of toluene to benzene and the subsequent catalytic hydrogenation of the resulting benzene to cyclohexane, with the novel features of this invention associated therewith.

I have discovered that where impure hydrogen streams, such as reformer offgas streams, are used in the exothermic hydrogenation of hydrocarbon materials, a more efficient and economical hydrogenation process can be effected by preliminarily catalytically demethylating the light demethylizable hydrocarbons present in the impure hydrogen stream prior to introducing such streams to a hydrogenation reactor. The resulting heat of demethylation can be used to advantage in bringing the hydrocarbon hydrogenation feed up to the initial reaction temperature in the hydrogenation reactor, thus lessening the feed heat requiremens. Further, by demethylating such light hydrocarbons in the impure hydrogen stream, these light hydrocarbons will not be present in the hydrogenation effluent where they would cause difficulties and higher operating expense in recovering a highly pure hydrogenation product. These light hydrocarbons comprise paraffins and olefins having two to six carbons per molecule, e.g., ethane, propane, butane, pentane, hexane, ethylene propylene, butylene, etc.

Referring now to the drawing wherein like reference numbers have been used to designate like parts and initially to FIGURE 1, a hydrodealkylation reactor is shown and generally designated 11, in which reactor an exothermic hydrogenation reaction is carried out. The hydrodealkylation can be carried out in the presence of powdered inert material or catalysts, or can be carried out in the absence of such materials. Reactor 11 is preferably a thermal hydrodealkylation reactor of the tubular type lined with gunnite or the like and provided with ceramic pipe internals and is operated at 400 to 1000 p.s.i.a., typically about 600 p.s.i.a. Toluene feed is passed through reactor 11 via line 12 together with a demethylated hydrogen-containing stream in line 13, the hydrogen-to-hydrocarbon mol ratio being from 0.5/1 to 20/1. In reactor 11, the toluene is dealkylated by an exothermic reaction to produce benzene and methane, this conversion being substantially quantitative, e.g., 85 percent or higher. The reactor effluent comprising benzene, methane and hydrogen in line 14, is cooled from about 1300—1500° F., typically about 1400° F., to about 800–1100° F., typically about 1000° F. by supplying quench medium via line 16. The toluene feed in line 12 can be passed in whole or part through a heat exchanger 17, the heat exchange medium for this purpose preferably being quenched reactor effluent.

According to this invention, hydrogen for the process is initially supplied in the form of an impure hydrogen stream, such as reformer offgas, via line 18. This reformer offgas is compressed by compressor 19, heat-exchanged with quenched reactor effluent in heat exchanger 20, and further heated in furnace 22. The heated reformer offgas is then passed via line 23 to a catalytic demethylation reactor 24 where the light hydrocarbons are demethylated to methane. The demethylated reformer offgas is then passed via line 13 and mixed with toluene in line 12 upstream of heat exchanger 17, the heat of demethylation developed in reactor 24 being thus used in further heating the toluene stream to the initial reaction temperature. Where such heat of demethylation is adequate to raise the temperature of a heated toluene stream to the initial reaction temperature, some of the toluene in feed supply line 12 can bypass heat exchanger 17 via line 26. To accomplish this, I propose to measure the reactor feed temperature by means of a thermocouple 27 or the like and transmit such temperature by a suitable temperature transmitter 28 to a conventional temperature controller 29, where the measured temperature is compared with a desired temperature supplied as a set point 31. The temperature controller 29 accordingly manipulates a control valve 32 in bypass line 26, increasing the bypass flow rate when the reactor feed temperature rises above a certain predetermined level, and decreasing the bypass flow rate when the reactor feed temperature drops below such level.

Since the light hydrocarbons present in the reformer offgas were demethylated to methane in reactor 24, they will not be present in hydrodealkylation reactor 11 or the effluent from the latter. Thus, the temperature increase across reactor 11 will be smaller, which means that this smaller temperature increase can be used to advantage in increasing the flow of the hydrocarbon feed to reactor 11. The only methane produced in reactor 11 is that due to the dealkylation of toluene to benzene, the heat of demethylation developed in reactor 24 being used to advantage to bring the toluene feed up to the initial reaction temperature.

The effluent from reactor 11 is passed via line 33 and further cooled by an air fan-cooler 34, and is then passed via line 36 to suitable means for the recovery of benzene. Such means preferably comprises a separation zone 37, which can be designated as a biphenyl tower having a plurality of liquid-vapor contact trays. In tower 37, bottoms comprising condensed aromatics, namely biphenyl, is withdrawn via line 38 and some of this bottoms is heated in reboiler heat exchanger 39 and returned via line 42 to the bottom of tower 37. The rest of the bottoms can be removed from the process or recycled via line 41 to toluene stream 12. Overheat comprising benzene, methane and hydrogen is withdrawn from tower 37 via line 43, cooled by means of air fan-cooler 44 and the resulting partially condensed benzene stream passed to a separator 46. The vapor phase contains the bulk of the normally gaseous materials (hydrogen and methane) plus benzene. The liquid phase contains small amounts of hydrogen and methane with benzene as the main component. The condensed material is withdrawn from separator 46 via line 47, some of this liquid being returned via line 48 as reflux to tower 37, and some of the liquid being recycled via line 16 to serve as quench medium in the cooling of reactor effluent of line 14.

The vapor withdrawn from separator 46 via line 49 is condensed by means of cooler 51 and passed to a separator 52, where the liquid phase comprising benzene is separated from the gaseous phase comprising hydrogen and methane. The gaseous phase is passed via line 53 to suitable hydrogen recovery means 54, where fuel gas is removed via line 56 and the recovered hydrogen is recycled via line 57 to the hydrodealkylation reactor feed line, a suitable furnace 58 being used to heat the recycled hydrogen stream to the desired temperature. The liquid phase withdrawn via line 59 from the bottom of separator 52 is passed to suitable fractionating means generally designated 61. Such means 61 can comprise a stabilizer tower for the removal of fuel gas 62, a benzene fractionator for the recovery of a benzene product stream 63, and a fractionator to separate a recycle toluene stream 64 from heavies 66 comprising $C_8$ and higher aromatic materials. Because the light hydrocarbons present in the initial reformer offgas have been converted to methane in the demethylation reactor 24, and methane is only slightly soluble in liquid stream 59, the methane remaining in the latter stream can be separated from the benzene product by a simple stabilizer tower or the like, whereas more elaborate separation equipment would be required to separate such light hydrocarbon as ethane, butane, etc., from the product.

FIGURE 2 illustrates another application of my invention: in this case, the hydrogenation of benzene to cyclohexane. In the hydrogenation process of FIGURE 2, a benzene feed stream is supplied via line 71 to a catalytic hydrogenation reactor 72. Reactor 72 can be operated at about 200 to 500 p.s.i.a., typically at about 475 p.s.i.a., and about 300 to 500° F., typically about 485° F. The effluent from reactor 72 is withdrawn via line 73 and can be passed through a heat exchanger 74 to heat and vaporize the benzene stream supplied via line 71. The reactor effluent can then be passed via line 76 to another heat exchanger 77 where it can be heat exchanged with reformer offgas supplied via line 18. The reformer offgas is further heated in furnace 22 and demethylated in reactor 24, as in FIGURE 1. The demethylated reformer offgas is passed via line 78 to the heated benzene stream in line 79 and the hydrogen-benzene mixture passed via line 81 to reactor 72. The hydrogen-to-hydrocarbon mol ratio can vary and generally will be within the range of 0.3/1 to 10/1. In reactor 72, the benzene is hydrogenated to cyclohexane, the conversion being substantially quantitative, e.g., 90 percent and higher (99.8 percent). By demethylating the reformer offgas prior to the admixture of the same with the benzene feed stream, the heat of demethylization of the light components in the reformer offgas is used to advantage to bring the temperature of the benzene feed up to the initial reaction temperature. Here again, I can detect the temperature in the feed stream 81 by means of a thermocouple 82 and transmit this temperature by a transmitter 83 to a temperature controller 84 which manipulates a valve 86 in a benzene bypass line 87, so that the heat load in exchanger 74 is employed only to that extent necessary when the heat of demethylization is not sufficient to bring the benzene feed stream up to the desired feed temperature. Another advantage of preliminarily demethylating the impure hydrogen stream is that the reaction effluent from reactor 72 will not contain the light hydrocarbons present in the initial impure hydrogen stream, their absence in this effluent making the recovery of the cyclohexane product much simpler and economical.

The effluent from reactor 72 can be subjected to suitable operations for the recovery of the cyclohexane product and recycle hydrogen. For example, this reactor effluent can be further cooled by means of an air fan-cooler 88 and cooler 89 and passed to a separator 91. A vapor stream comprising hydrogen, methane and traces of cyclohexane is withdrawn from separator 91 via line 92 and passed to suitable recovery equipment 54, from which hydrogen is recovered and passed via line 57 and furnace 58 as recycle hydrogen to reactor feed line 81. The liquid withdrawn from separator 91 via line 93 comprises cyclohexane, some of which can be recycled to line 71 to maintain the proper hydrogen-to-hydrocarbon mol ratio. The cyclohexane can be heated in heat exchanger 94 and passed to a cyclohexane stabilizer 96, the latter being a column having a plurality of trays used to remove components lighter than cyclohexane such as methane. Bottoms comprising cyclohexane is withdrawn from stabilizer 96 via line 97, some of this bottoms being heated in reboiler 98 and returned via line 99 to the column, and the rest of the bottoms being passed via line 101 as heat exchange medium for heat exchanger 94. Overhead comprising methane, hydrogen and some cyclohexane is withdrawn from stabilizer 96 via line 102 and after being cooled in cooler 103 is passed to a separator 104. Condensed overheat, primarily cyclohexane, is returned via line 106 as reflux to stabilizer 96 and the uncondensed vapor is withdrawn via line 107 as fuel gas. The stabilized cyclohexane liquid stream in line 108 can be yielded as product. When the benzene feed stream 71 contains some toluene, liquid stream 108 can be passed as feed to a cyclohexane column 109, this column containing a plurality of trays and being used to remove the heavier materials, such as methyl cyclohexane, from the cyclohexane product. Bottoms comprising methyl cyclohexane is withdrawn from column 109 via line 111, some of this bottoms being heated in reboiler 112 and returned via line 113 to column 109, and the rest of the bottoms being passed via line 114 and cooler 116 to further processing or utility. The cyclohexane overhead is withdrawn from column 109 via line 117 and after being cooled by air fan-cooler 118 is passed to an accumulator 119. Liquid cyclohexane is withdrawn from accumulator 119, some of this liquid being returned via line 121 as reflux to column 109, and the rest of the liquid being cooled by cooler 122 and yielded as product via line 123.

In FIGURE 3, I have illustrated my invention as applied to an integrated process for the hydrodealkylation of toluene to benzene and the subsequent hydrogenation of the resulting benzene to cyclohexane. Like FIGURE 1, the toluene is mixed with the demethylated reformer offgas and the mixture passed to a hydrodealkylation reactor 11. The reactor effluent is then passed to a biphenyl tower 37 for the removal of condensed aromatics. However, unlike FIGURE 1, the gas comprising benzene and hydrogen which is withdrawn from separator 46 is not cooled but rather is passed via line 124 to a hydrogenation reactor 72. The gas in line 124 can be passed to heat exchanger 74 where it is heat exchanged with the bottoms 73 and withdrawn from hydrogenation reactor 72. The cyclohexane product in the effluent from the hydrogenation reactor 72 can be recovered as in FIGURE 2. This integrated process dispenses with the intermediate recovery of the hydrogen and benzene from the dehydrodealkylation effluent. The benzene-containing effluent produced by the hydrodealkylation reaction illustrated in FIGURE 3 does not have to be fractionated, condensed and revaporized as feed in the hydrogenation reactor 72. Only one unit is required for the recovery and purification of hydrogen and the recycle of the same to the two reactions.

The impure hydrogen gas used in this invention can be obtained from a variety of sources, typical of which will be the offgas from reforming operations. The gas will generally contain at least 65 volume percent in hydrogen, typically about 80 to 96 volume percent. The composition of a typical reformer offgas before and after its demethylation according to the invention is set forth in Table I.

Table I

| Component | Composition of reformer offgas make-up, vol. percent | Composition of demethylated reformer offgas, vol. percent |
| --- | --- | --- |
| $H_2$ | 90 | 81.7 |
| $C_1$ | 5.0 | 18.3 |
| $C_2$ | 2.5 | 0 |
| $C_3$ | 1.7 | 0 |
| $C_4+$ | 0.8 | 0 |
| Total | 100.0 | 100.0 |

The impure hydrogen stream used contains a minor amount of at least one light hydrocarbon demethylizable at the temperature of contacting in the demethylation reactor. Such hydrocarbons will include paraffinic hydrocarbons, such as ethane, propane, butane, pentane and hexane, and olefinic hydrocarbons, such as ethylene, propylene and butylene.

The catalyst used in demethylating the impure hydrogen stream can be any metal hydrogenation catalyst or compound thereof, known in the art. The metal used can be any of the heavy metals, i.e., those having an atomic weight of 22 or higher. A preferred class of metals consists of chromium, molybdenum, tungsten, uranium, iron, cobalt, nickel, osmium, iridium, ruthenium, rhodium, palladium and platinum. They can be employed in the form of their oxides, but the free metals in finely divided form can be employed, or other compounds thereof such as the sulfides, sulfites, phosphites, or phosphates. There materials can be employed singly or in admixture one with another, or they can be deposited on a carrier such as alumina, silica gel, zirconia, thoria, magnesia, titania, montmorillonite clay, bauxite, diatomaceous earth, crushed porcelain, or any other refractory material which has no adverse affect on the reaction. The preferred catalyst used in this invention is nickel supported on kieselguhr and alumina, such as Harshaw catalyst Type R-1124.

The hydrogenation catalyst is preferably loaded in the demethylation reactor in the form of a fixed bed. The impure hydrogen stream, heated to about 500 to 850° F., typically about 700° F., is introduced into the demethylation reactor, preferably at the upper end thereof where a fixed bed is used, at a pressure of about 300 to 1200 p.s.i.a., the space velocity varying with the type of catalyst used, for example where the nickel on kieselguhr catalyst is used, the space velocity will be about 5/1 standard cubic feet per pound of catalyst per hour, and where platinum on alumina is used there will be about 0.5/1 standard cubic feet per pound of catalyst per hour. The temperature increase across the demethylation reactor will vary, depending upon the amount and type of the light hydrocarbons present in the make-up reformer offgas.

The demethylated hydrocarbon stream used in this invention can be employed in any exothermic hydrogenation process, and the term "hydrogenation" is used in this application and the appended claims in the generic sense to cover those hydrogenation processes wherein an unsaturated hydrocarbon feed, such as benzene, is converted to a more saturated hydrocarbon, such as cyclohexane, and to cover dealkylation of alkyl substituted aromatics, such as in the case of dealkylation of toluene to benzene, or methyl naphthalene to naphthalene. I prefer to use this latter dealkylation process in dealkylating alkyl benzene feeds in general, the term "alkyl benzene" as used herein being generic to mono-alkylbenzene and poly-alkylbenzene. Representative alkylenbenzes which can be used as feeds include toluene, xylene, ethylbenzene, diethylbenzene, cumene, propylbenzene, isopropylbenzene, diisopropylbenzene, butylbenzene, amylbenzene mesitylene, methyl-ethylbenzene, pseudocumene, hemimellitene, prehnitrene, durene, and the like, including mixtures of hydrocarbons containing one or more of these compounds. The methylbenzene hydrocarbons, such as toluene and xylene are preferred, since higher alkylbenzenes will tend in some cases to enter side reactions.

This dealkylation is preferably of the non-catalytic type, i.e., thermal hydrodealkylation; however, the dealkylation can also be catalytic and the catalyst can be any of the metal catalysts or compounds thereof, such as those described above for the demethylation reaction. The same catalyst can be used in those hydrogenation processes where an unsaturated hydrocarbon is converted to a more saturated hydrocarbon. Further details of the hydrogenation processes in which the demethylated hydrogen stream of this invention can be used will be omitted in the interest of brevity, since the same will be readily apparent to those skilled in the art upon being acquainted with this invention.

As a specific example, referring to FIGURE 1, reformer offgas having the composition set forth in Table II below is passed to demethylation reactor 24 via line 18 at a space velocity of 100 cubic feet gas/per hour/per cubic foot catalyst.

Table II

| Component: | Amount of component, mol percent |
| --- | --- |
| $H_2$ | 90.0 |
| $CH_4$ | 5.0 |
| $C_2H_6$ | 2.5 |
| $C_3H_8$ | 1.7 |
| $C_4H_{10}+$ | 0.8 |

Reactor 24 is operated at 700 p.s.i.g., with an inlet temperature of 700° F. and an outlet temperature of 1100° F., and is loaded with a fixed bed of platinum on alumina catalyst, such as described in U.S. Patent No. 2,479,109. The demethylized reformer offgas is withdrawn as effluent via line 13 from reactor 24, and this effluent has the composition set forth in Table III below and is supplied at the rate of 922 mols/hour.

Table III

| Component: | Amount of component, mol percent |
|---|---|
| $H_2$ | 81.7 |
| $CH_4$ | 18.3 |

Toluene is supplied via line 12 at the rate of 100 barrels/hour. Recycle hydrogen having the composition set forth in Table IV below is supplied at the rate of 892 mols/hour.

Table IV

| Component: | Amount of component, mol percent |
|---|---|
| $H_2$ | 50.0 |
| $CH_4$ | 50.0 |

The reactor feed, having a hydrogen-to-toluene mole ratio of 4/1 is passed into thermal hydrodealkylation reactor 11, operated at 600 p.s.i.g., with an inlet temperature of 1100° F. and an outlet temperature of 1400° F. The toluene is dealkylated to benzene in reactor 11, the mol conversion of the toluene being 87 percent per pass. The hydrodealkylation effluent is cooled, separated, and processes as shown in FIGURE 1, the amount of benzene product yielded being 66 barrels/hour.

Various modifications and alterations of this invention will become apparent to those skilled in the art without departing from the scope and spirit of this invention, and it should be understood this invention is not to be limited unduly to that set forth herein for illustrative purposes.

I claim:

1. The method comprising passing an impure hydrogen stream consisting essentially of light demethylizable hydrocarbons to a reaction zone containing a hydrogenation catalyst, converting said hydrocarbons in said zone to methane, withdrawing from said zone an effluent stream consisting essentially of hydrogen and methane, immediately mixing said effluent with a hydrocarbon feed utilizing the heat of conversion of the said demethylizable hydrocarbon to raise the temperature of the hydrocarbons to methane feed to the initial reaction temperature, passing the resulting mixture to a hydrogenation zone, hydrogenating said hydrocarbon feed in said hydrogenation zone, withdrawing from said hydrogenation zone an effluent stream comprising a hydrogenated product, hydrogen, and methane.

2. The method according to claim 1 wherein said hydrocarbon feed is an alkylbenzene, said hydrogenated product is benzene, and said hydrogenation zone is a thermal hydrodealkylation zone.

3. The method according to claim 1 wherein said hydrocarbon feed is toluene, said hydrogenated product is benzene, said hydrogenation zone is a thermal hydrodealkylation zone, and said impure hydrogen stream is reformer offgas.

4. The method according to claim 1 wherein said hydrocarbon feed is benzene, said hydrogenated product is cyclohexane, and said hydrogenation zone is a catalytic hydrogenation zone.

5. The method comprising passing reformer offgas consisting essentially of hydrogen and light demethylizable hydrocarbons comprising paraffins and olefins having 2 to 6 carbon atoms per molecule to a reaction zone containing hydrogenation catalyst, converting said hydrocarbons in said zone to methane, withdrawing from said zone an effluent stream consisting essentially of hydrogen and methane, immediately mixing said effluent stream with a hydrocarbon feed, utilizing the heat of conversion of the said demethylizable hydrocarbons to methane to raise the temperature of the said hydrocarbon feed, passing the resulting mixture to a hydrogenation zone, hydrogenating said hydrocarbon feed in said hydrogenation zone, withdrawing from said hydrogenation zone an effluent stream comprising a hydrogenated product, hydrogen, and methane.

References Cited by the Examiner
UNITED STATES PATENTS

| 2,901,423 | 8/59 | Herbert et al. | 208—254 |
| 2,995,511 | 8/61 | Herbert et al. | 208—216 |

ALPHONSO D. SULLIVAN, *Primary Examiner.*

UNITED STATES PATENT OFFICE
CERTIFICATE OF CORRECTION

Patent No. 3,213,150            October 19, 1965

John T. Cabbage

It is hereby certified that error appears in the above numbered patent requiring correction and that the said Letters Patent should read as corrected below.

Column 7, line 40, for "hydrocarbon" read -- hydrocarbons to methane --; same line 40, for "hydrocarbons" read -- hydrocarbon --; line 41, strike out "to methane".

Signed and sealed this 6th day of September 1966.

(SEAL)
Attest:

ERNEST W. SWIDER
Attesting Officer

EDWARD J. BRENNER
Commissioner of Patents